(12) United States Patent
Huffman

(10) Patent No.: US 7,116,459 B2
(45) Date of Patent: Oct. 3, 2006

(54) FIELD DIODE DETECTION OF EXCESS LIGHT CONDITIONS FOR SPATIAL LIGHT MODULATOR

(75) Inventor: James D. Huffman, Cambridge (GB)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/328,508

(22) Filed: Dec. 23, 2002

(65) Prior Publication Data

US 2003/0123123 A1 Jul. 3, 2003

Related U.S. Application Data

(60) Provisional application No. 60/344,220, filed on Dec. 27, 2001.

(51) Int. Cl.
*G02F 1/01* (2006.01)

(52) U.S. Cl. .................. 359/239; 250/208.4

(58) Field of Classification Search ............ 359/238, 359/263, 247, 237, 277, 276, 254, 266, 283, 359/284, 298, 302, 239; 250/208.4
See application file for complete search history.

(56) References Cited

U.S. PATENT DOCUMENTS

| | | | |
|---|---|---|---|
| 4,615,595 A * | 10/1986 | Hornbeck | 353/122 |
| 5,179,274 A | 1/1993 | Sampsell | |
| 5,481,118 A * | 1/1996 | Tew | 250/551 |
| 5,535,047 A * | 7/1996 | Hornbeck | 359/295 |
| 5,561,287 A * | 10/1996 | Turner et al. | 250/208.2 |
| 6,188,427 B1 | 2/2001 | Anderson et al. | |
| 6,410,903 B1 | 6/2002 | Miyazaki | |
| 6,624,756 B1 * | 9/2003 | Butterworth | 340/815.4 |
| 6,683,290 B1 | 1/2004 | Doherty | |

* cited by examiner

*Primary Examiner*—Hung Xuan Dang
*Assistant Examiner*—Joseph Martinez
(74) *Attorney, Agent, or Firm*—Charles A. Brill; Wade James Brady, III; Frederick J. Telecky, Jr.

(57) ABSTRACT

An improved SLM that is capable of detecting when light incident on the SLM exceeds a predetermined threshold. A diode is fabricated around, or within the pixel array. Light incident on the array (and the diode) results in a current increase through the diode, which may detected and used to initiate a disable signal to control circuitry of the SLM.

16 Claims, 2 Drawing Sheets

FIELD DIODE DETECTION OF EXCESS LIGHT CONDITIONS FOR SPATIAL LIGHT MODULATOR

This application claims priority under 35 USC § 119(e)(1) of provisional application No. 60/344,220 filed Dec. 27, 2001.

TECHNICAL FIELD OF THE INVENTION

This invention relates to spatial light modulators, and more particularly to detection of conditions in which the light incident on the spatial light modulator exceeds a predetermined intensity.

BACKGROUND OF THE INVENTION

A Digital Micromirror Device™ (DMD™) is a type of microelectromechanical systems (MEMS) device. Invented in 1987 at Texas Instruments Incorporated, the DMD is a fast, reflective digital spatial light modulator. It can be combined with image processing, memory, a light source, and optics to form a digital light processing system capable of projecting large, bright, high-contrast color images.

The DMD is fabricated using CMOS-like processes over a CMOS memory. It has an array of individually addressable mirror elements, each having an aluminum mirror that can reflect light in one of two directions depending on the state of an underlying memory cell. With the memory cell in a first state, the mirror rotates to +10 degrees. With the memory cell in a second state, the mirror rotates to −10 degrees. By combining the DMD with a suitable light source and projection optics, the mirror reflects incident light either into or out of the pupil of the projection lens. Thus, the first state of the mirror appears bright and the second state of the mirror appears dark. Gray scale is achieved by binary pulsewidth modulation of the incident light. Color is achieved by using color filters, either stationary or rotating, in combination with one, two, or three DMD chips.

SUMMARY OF THE INVENTION

One aspect of the invention is an improved spatial light modulator (SLM) having an array of pixel elements and control circuitry. In one embodiment, the improvement comprises a diode placed around at least a portion of the perimeter of the pixel array, the diode operable to conduct current in response to light incident on the pixel array. A disable circuit is operable to receive the current from the diode and to deliver a disable signal to the control circuitry when the current exceeds a predetermined amplitude.

An advantage of the invention is that it provides a cost effective means to detect overlight conditions, that is, conditions when light incident on the SLM exceeds a predetermined threshold. The collection diode may be fabricated using CMOS processes consistent with fabrication of the SLM. Existing voltages that are used to operate the SLM may be used to bias the diode.

The diode may be used to detect the overlight conditions in a manner that is transparent to the user of the SLM. It may be fabricated in a manner such that it is integral to the SLM and does not affect its operation.

DETAILED DESCRIPTION OF THE INVENTION

The following discussion is related to use of a reverse-biased N-well diode as a light collector for a spatial light modulator (SLM). The didode forms a recombination region in the substrate of the SLM for photogenerated holes, which can be sensed as an increase in current through the diode. The sensed current may then be used to detect an "overlight" condition, that is, a condition in which the intensity of light incident on the SLM exceeds a predetermined intensity.

The diode may be fabricated using standard CMOS fabrication processes. The biasing voltages for the diode may be the same as those used for operation of the DMD. Further, the bias voltage may be from a low current power supply so that the signal to noise ratio of the photogenerated current is substantial.

Figure 1:
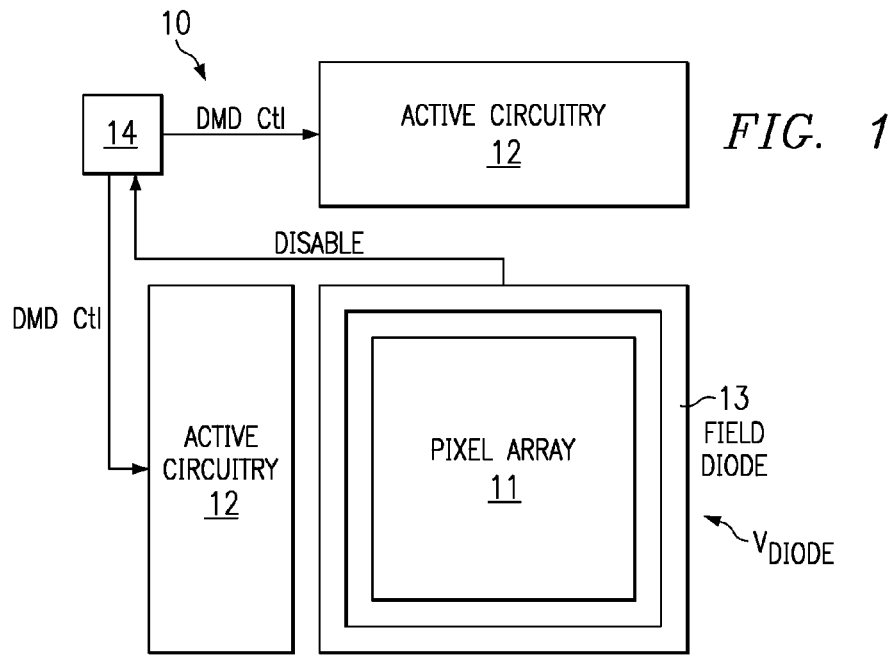
FIG. 1 is a top plan view of an SLM having a light collection diode surrounding its pixel array.
Figure 2:
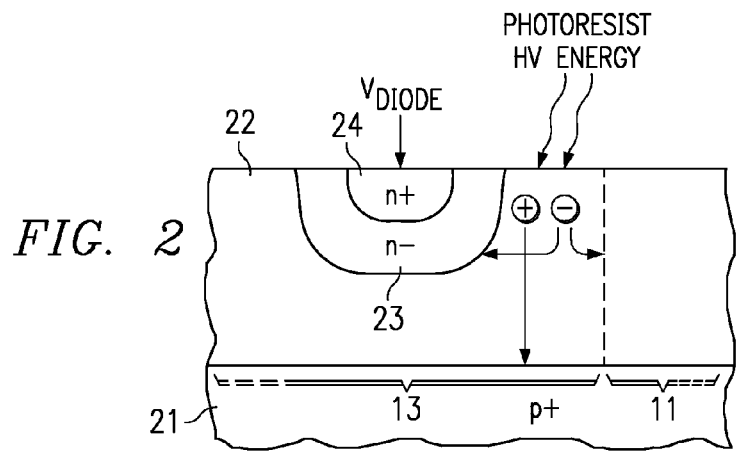
FIG. 2 is a cross sectional view of the diode of FIG. 1.

FIG. 1 is a top view of an SLM 10 having a field diode 13 surrounding the pixel array 11. FIG. 2 is a cross sectional view of the diode 13 of FIG. 1.

For purposes of example herein SLM 10 is a DMD type SLM. As discussed in the Background, a DMD 10 is comprised of an array 11 of hundreds or thousands of micro-mirror elements, also referred to as "pixel elements". Peripheral (active) circuitry 12 is used to load data to the pixel elements and control their operation. A control circuit 14 delivers control signals to the peripheral circuitry 12.

As illustrated in FIG. 2, the SLM substrate 21 is a p+ type material, in which the diode 13 is formed. A p− type epitaxial layer 22 is above the substrate 21. An n− well is fabricated in layer 22, and surrounds a smaller n+ region 23 at the surface of the DMD 10. A voltage, $V_{diode}$, provides a reverse bias to diode 13. As indicated in FIG. 2, when light is incident on the surface of the SLM 10, photogenerated electrons recombine in the field diode 13 or at another positive bias junction.

Figure 3:
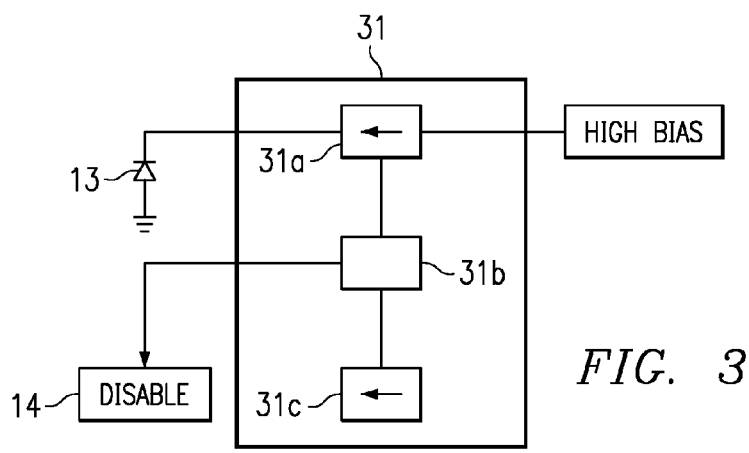
FIG. 3 illustrates a disable circuit, which senses current through the diode and provides a disable signal to control circuitry of the SLM.

FIG. 3 illustrates a disable circuit 31, used to disable the SLM 10 when the incident light exceeds a predetermined intensity. As stated above, light incident on the SLM 10 is sensed as an increase in the diode current. A sense amp 31a senses this current and delivers it to a comparator 31b. A comparator 31b compares the diode current with a predetermined reference current 31c. If the diode current exceeds the reference current, comparator 31b delivers a signal to control circuit 14, which then disables the SLM 10.

When SLM 10 is a DMD, one possible DMD operating voltage that may be used for $V_{diode}$ is the shield bias, which has no direct current. Another available voltage is the Vcc2 voltage.

Figure 4:
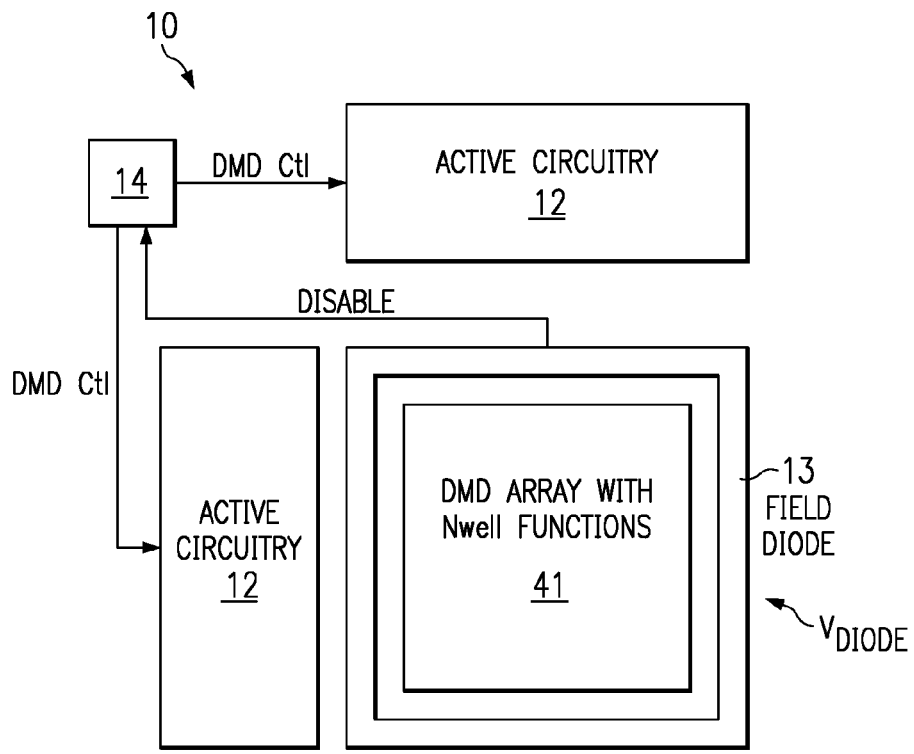
FIG. 4 illustrates an alternative embodiment, where the SLM array includes light collection diodes.

FIG. 4 illustrates an alternative embodiment of the invention. Rather than surrounding the SLM array with a field diode, SLM 40 has a modified array 41, which includes positive biased n-well junctions.

Figure 5:
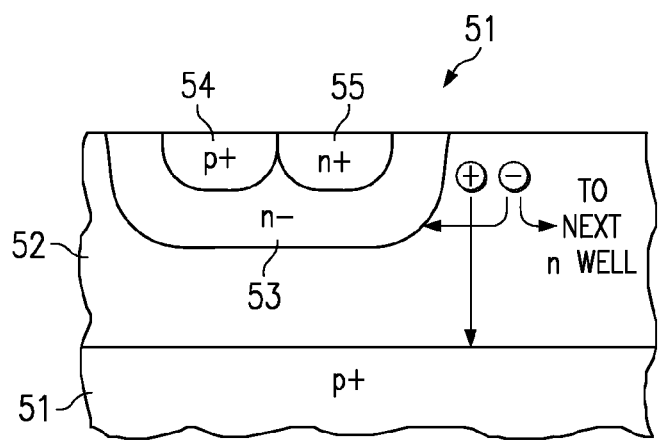
FIG. 5 is a cross sectional view of a diode of the SLM array of FIG. 4.

FIG. 5 is a cross sectional view of an n-well junction 51 in array 41. An n− well 53 is formed in substrate 51 as described above in connection with FIG. 2. In a DMD type SLM 40, the existing array n-well may be used to form the diode. Two smaller doped regions, one p+ type 54 and one n+ type 55, are located within the n– well 53 at the surface of the SLM 40. As illustrated, when light is incident on the SLM, photogenerated electrons recombine in the array 41 to set up a signal current that will be superimposed on the existing current.

In both of the above-described embodiments, it may be desirable for the diode 13 or the diodes in array 41 to cover much of the exposure field of the SLM 10. The diode(s) may thereby rely on a large surface area for collection efficiency. This helps ensure that the collection current is immune to surface variations in the doping profiles of the silicon. Thus, in the example of FIG. 1, diode 13 completely surrounds the array 11. In the example of FIG. 4, the entire array 41 includes diodes. However, in other embodiments, diode 11 might surround only a portion of array 11, or only a portion of array 41 might include diodes.

Although the foregoing description is in terms of a DMD, the same concepts are applicable to other types of SLMs. For example, the embodiments of FIGS. 1 and 4 could be implemented to provide a disable signal for a liquid crystal device (LCD) array. It is anticipated that, consistent with FIGS. 1 and 4, the SLM will be comprised of an array such as arrays 11 and 41 and some sort of control circuitry 14 to be disabled.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A spatial light modulator comprising:
   an array of spatial light modulating pixel elements;
   control circuitry to control the operation of the pixel elements;
   a diode placed around at least a portion of the perimeter of the pixel array and extending along an outer edge of at least two adjacent spatial light modulating pixel elements located along the perimeter of the pixel array, the diode operable to conduct current in response to light incident on the pixel array; and
   a disable circuit operable to receive the current from the diode and to deliver a disable signal to the control circuitry when the current exceeds a predetermined amplitude, said control circuitry operable to disable the array of spatial light modulating elements in response to the disable signal.

2. The spatial light modulator of claim 1, wherein the spatial light modulator is a micro-mirror device and the pixel array is an array of micro-mirror elements.

3. The spatial light modulator of claim 1, wherein the spatial light modulator is a liquid crystal device and the pixel array is an array of liquid crystal elements.

4. The spatial light modulator of claim 1, wherein the diode is an n-well diode.

5. The spatial light modulator of claim 1, wherein the diode is reverse biased.

6. The spatial light modulator of claim 1, wherein the diode is biased in electrical connection with an operating voltage of the spatial light modulator.

7. The spatial light modulator of claim 1 wherein the diode completely surrounds the pixel array.

8. A spatial light modulator comprising:
   an array of spatial light modulator elements;
   control circuitry operable to disable the array of spatial light modulating elements in response to a disable signal;
   for at least selected spatial light modulating elements in the array, a single diode fabricated for each respective selected spatial light modulating element in the pixel array, wherein each single diode is operable to conduct current in response to light incident on the pixel array; and
   a disable circuit operable to receive the current from each single diode and to deliver the disable signal to the control circuitry when the current exceeds a predetermined amplitude.

9. The spatial light modulator of claim 8, wherein the spatial light modulator is an array of micro-mirror elements.

10. The spatial light modulator of claim 8, wherein the spatial light modulator is an array of liquid crystal elements.

11. The spatial light modulator of claim 8, wherein the diode is an n-well diode.

12. The spatial light modulator of claim 8, wherein the diode is reverse biased.

13. The spatial light modulator of claim 8, wherein the diode is biased in electrical connection with an operating voltage of the spatial light modulator.

14. An array of digital micromirror pixel elements, comprising:
   a mirror layer having a reflective mirror associated with each pixel element;
   a hinge layer spaced under the mirror layer, the hinge layer having a torsion hinge under each mirror and attached to the mirror such that the mirror may tilt above the hinge layer;
   an address layer spaced under the hinge layer, the address layer having circuitry for controlling operation of the pixel elements;
   a diode placed around at least a portion of the perimeter of the pixel elements and extending along an outer edge of at least two adjacent pixel elements located along the perimeter of the array the diode operable to conduct current in response to light incident on the mirrors; and
   a disable circuit operable to receive the current from the diode and to disable operation of the pixel elements when the current exceeds a predetermined amplitude.

15. The spatial light modulator of claim 14 wherein the diode completely surrounds the array.

16. An array of digital micromirror pixel elements, comprising:
   a mirror layer having a reflective mirror associated with each pixel element;
   a hinge layer spaced under the mirror layer, the binge layer having a torsion hinge under each mirror and attached to the mirror such that the mirror may tilt above the hinge layer;
   an address layer spaced under the hinge layer, the address layer having circuitry for controlling operation of the pixel elements;
   at least one diode fabricated within the mirror layer, the diode operable to conduct current in response to light incident on the mirrors; and
   a disable circuit operable to receive the current from the diode and to disable operation of the pixel elements when the current exceeds a predetermined amplitude.

* * * * *